United States Patent
Gilson et al.

(10) Patent No.: US 11,575,277 B2
(45) Date of Patent: Feb. 7, 2023

(54) NODE POWER EXTRACTION IN A WAVEGUIDE SYSTEM

(71) Applicant: Raytheon Technologies Corporation, Farmington, CT (US)

(72) Inventors: Jonathan Gilson, West Hartford, CT (US); Joseph V. Mantese, Ellington, CT (US); Gurkan Gok, Milford, CT (US); Goran Djuknic, New York, NY (US); Coy Bruce Wood, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 190 days.

(21) Appl. No.: 17/063,001

(22) Filed: Oct. 5, 2020

(65) Prior Publication Data

US 2022/0109327 A1     Apr. 7, 2022

(51) Int. Cl.
*H02J 50/00*    (2016.01)
*H02J 50/20*    (2016.01)
(Continued)

(52) U.S. Cl.
CPC .............. *H02J 50/001* (2020.01); *F02C 7/36* (2013.01); *H02J 50/20* (2016.02); *H04B 5/0037* (2013.01);
(Continued)

(58) Field of Classification Search
None
See application file for complete search history.

(56) References Cited

U.S. PATENT DOCUMENTS 3,308,468 A    3/1967    Hannan
3,308,469 A    3/1967    Hannan
(Continued)

FOREIGN PATENT DOCUMENTS

DE    19705769 A1    8/1998
EP    3291041 A1    3/2018
(Continued)

OTHER PUBLICATIONS

European Office Action for European Application No. 21201068.0; Application Filing Date:Oct. 5, 2021; dated Feb. 21, 2022; 9 pages.
(Continued)

*Primary Examiner* — Jared Fureman
*Assistant Examiner* — Joel Barnett
(74) *Attorney, Agent, or Firm* — Cantor Colburn LLP

(57) ABSTRACT

A system of a machine includes a network of a plurality of nodes distributed throughout the machine, a controller, and a power extraction system within at least one of the nodes. Each of the nodes is operable to communicate through one or more radio frequencies. The controller is configured to communicate with the network of nodes by transmitting the one or more radio frequencies through one or more waveguides. The power extraction system is configured to extract power from the one or more radio frequencies as a first power source, extract power from a second power source, and provide power to one or more components of the system based on power extracted from either or both of the first power source and the second power source.

19 Claims, 4 Drawing Sheets

(51) Int. Cl.
*F02C 7/36* (2006.01)
*H04B 5/00* (2006.01)

(52) U.S. Cl.
CPC ...... *F05D 2220/74* (2013.01); *F05D 2220/76* (2013.01); *H02J 2310/44* (2020.01)

(56) References Cited

U.S. PATENT DOCUMENTS

| | | | |
|---|---|---|---|
| 4,533,884 A | 8/1985 | Hudspeth et al. | |
| 5,212,943 A | 5/1993 | Harris | |
| 5,479,826 A | 1/1996 | Twerdochlib et al. | |
| 5,818,242 A | 10/1998 | Grzybowski et al. | |
| 6,037,908 A | 3/2000 | Phillips et al. | |
| 6,717,418 B2 | 4/2004 | Orenstein | |
| 7,231,180 B2 | 6/2007 | Benson et al. | |
| 7,276,703 B2 | 10/2007 | Berkean et al. | |
| 7,688,081 B2 | 3/2010 | Webster | |
| 7,722,310 B2 | 5/2010 | Balasubramaniam et al. | |
| 7,825,669 B2 | 11/2010 | Parsons et al. | |
| 7,890,293 B2 | 2/2011 | Bosselmann et al. | |
| 8,121,813 B2 | 2/2012 | Ren et al. | |
| 8,552,597 B2 | 10/2013 | Song et al. | |
| 8,558,538 B2 | 10/2013 | Phillips et al. | |
| 9,057,596 B2 | 6/2015 | Xu et al. | |
| 9,303,523 B2 | 4/2016 | Rodriguez et al. | |
| 9,677,868 B2 | 6/2017 | Singh et al. | |
| 9,986,310 B2 | 5/2018 | Sobanski et al. | |
| 10,247,031 B2 | 4/2019 | Carter et al. | |
| 10,280,787 B2 | 5/2019 | Pratt et al. | |
| 10,307,138 B2 | 6/2019 | Heims et al. | |
| 10,309,342 B2 | 6/2019 | Mueller et al. | |
| 10,316,686 B2 | 6/2019 | Hudson et al. | |
| 10,411,756 B2 | 9/2019 | Snyder et al. | |
| 10,998,958 B1 | 5/2021 | Gilson et al. | |
| 11,265,380 B1 | 3/2022 | Gilson et al. | |
| 2003/0094956 A1 | 5/2003 | Orenstein | |
| 2007/0114422 A1* | 5/2007 | Berkcan | G01M 5/00 250/358.1 |
| 2010/0066387 A1 | 3/2010 | Bosselmann et al. | |
| 2011/0018686 A1* | 1/2011 | Fahley | H02J 50/001 340/10.1 |
| 2011/0194122 A1 | 8/2011 | Heyworth et al. | |
| 2012/0079830 A1 | 4/2012 | Rodriguez et al. | |
| 2012/0119020 A1 | 5/2012 | Burns et al. | |
| 2014/0083183 A1 | 3/2014 | Edvardsson | |
| 2015/0022373 A1* | 1/2015 | Bommer | H04W 84/18 340/870.11 |
| 2016/0273973 A1 | 9/2016 | Larsen et al. | |
| 2017/0007254 A1 | 1/2017 | Jaworek et al. | |
| 2017/0335795 A1 | 11/2017 | Klemen et al. | |
| 2018/0219579 A1 | 8/2018 | Britz et al. | |
| 2018/0266969 A1 | 9/2018 | Jean et al. | |
| 2018/0289359 A1 | 10/2018 | Heims et al. | |
| 2018/0294838 A1 | 10/2018 | Snyder et al. | |
| 2018/0375590 A1* | 12/2018 | Skertic | H04B 10/808 |
| 2019/0250058 A1 | 8/2019 | Schofield | |
| 2022/0107277 A1 | 4/2022 | Gilson et al. | |

FOREIGN PATENT DOCUMENTS

| | | |
|---|---|---|
| EP | 3291570 A1 | 3/2018 |
| EP | 3296635 A1 | 3/2018 |
| EP | 3826188 A1 | 5/2021 |
| WO | 2011153496 A1 | 12/2011 |

OTHER PUBLICATIONS

European Partial Search Report for European Application No. 21201073.0; Application Filing Date: Oct. 5, 2021; dated Feb. 24, 2022; 13 pages.
European Search Report for European Application No. 21201061.5; Application Filing Date: Oct. 5, 2021; dated Mar. 7, 2022; 8 pages.
European Search Report for European Application No. 21201074.8; Application Filing Date: Oct. 5, 2021; dated Feb. 28, 2022; 6 pages.
Partial European Search Report for European Application No. 21201062.3; Application Filing Date: Oct. 5, 2021; dated Feb. 28, 2022; 10 pages.

\* cited by examiner

NODE POWER EXTRACTION IN A WAVEGUIDE SYSTEM

BACKGROUND

This disclosure relates to electromagnetic communication, and more particularly to node power extraction in a waveguide system.

As control and health monitoring systems become more complex, the interconnect count between system components increases, which also increases failure probabilities. With the increase in interconnects, large amounts of cabling may be used to connect sensors and actuators to controllers and/or diagnostic units of a machine. Long cable runs, including multiple wires, can add substantial weight and may increase susceptibility to noise effects and/or other forms of signal degradation. Increased wire connections can also result in a larger number of wire harnesses to remove and attach when servicing machine components. A larger number of wires and wire harnesses can increase the possibility of damage at pin/socket interconnects, particularly when the wire harnesses are attached and detached from components.

To achieve desired control and/or health monitoring, sensing systems may need information from locations that can be difficult to access due to moving parts, internal operating environment or machine configuration. The access limitations can make wire routing bulky, expensive, and potentially vulnerable to interconnect failures. Sensor and interconnect operating environments for desired sensor locations may exceed the capability of interconnect systems. In some cases, cable cost, volume, and weight may exceed desired limits for practical applications. Placement options and total number of sensors and actuators that may be installed in a machine can be limited by wiring and connector impacts on weight, reliability, physical sizing, and operating temperature limitations. Further, where power lines are routed in close proximity to communication lines, there can be a greater risk of crosstalk or noise transfer from the power lines to the communication lines. Such impacts may reduce signal-to-noise ratio and thereby reduce accuracy and/or reliability of data transmitted on the communication lines.

BRIEF DESCRIPTION

According to one embodiment, a system of a machine includes a network of a plurality of nodes distributed throughout the machine, a controller, and a power extraction system within at least one of the nodes. Each of the nodes is operable to communicate through one or more radio frequencies. The controller is configured to communicate with the network of nodes by transmitting the one or more radio frequencies through one or more waveguides. The power extraction system is configured to extract power from the one or more radio frequencies as a first power source, extract power from a second power source, and provide power to one or more components of the system based on power extracted from either or both of the first power source and the second power source.

In addition to one or more of the features described above or below, or as an alternative, further embodiments may include a diplexer configured to separate a power transmission frequency from a communication transmission frequency of the one or more radio frequencies, and a harvester configured to extract power from the power transmission frequency as the first power source.

In addition to one or more of the features described above or below, or as an alternative, further embodiments may include a circulator configured to pass a combined power and communication transmission frequency from the one or more radio frequencies to a harvester configured to extract power.

In addition to one or more of the features described above or below, or as an alternative, further embodiments may include where the power extraction system includes a harvester with a radio frequency rectifier configured to perform power extraction from the one or more radio frequencies, and a power manager to control power distribution to the one or more components of the system.

In addition to one or more of the features described above or below, or as an alternative, further embodiments may include where the harvester includes a power transfer unit configured to transfer wireless power to one or more of the nodes of the network.

In addition to one or more of the features described above or below, or as an alternative, further embodiments may include where the radio frequency rectifier is configured to receive wireless power from one or more of the nodes of the network as the second power source.

In addition to one or more of the features described above or below, or as an alternative, further embodiments may include where the harvester further includes an environmental energy harvester configured to extract energy from an environment proximate to the power extraction system as the second power source.

According to an embodiment, a system for a gas turbine engine includes a network of a plurality of nodes distributed throughout the gas turbine engine, a controller of the gas turbine engine, and a power extraction system within at least one of the nodes. Each of the nodes can be associated with at least one sensor and/or actuator of the gas turbine engine and operable to communicate through one or more radio frequencies. The controller can be configured to communicate with the network of nodes by transmitting the one or more radio frequencies through one or more waveguides. The power extraction system is configured to extract power from the one or more radio frequencies as a first power source, extract power from a second power source, and provide power to one or more components of the system based on power extracted from either or both of the first power source and the second power source.

In addition to one or more of the features described above or below, or as an alternative, further embodiments may include where the harvester further includes a reservoir configured to store power, and where the power manager is configured to provide power to communicate with the controller and to power the at least one sensor and/or actuator of the gas turbine engine based on power selected from at least one of the first power source, the second power source, and the reservoir.

According to an embodiment, a method of powering a node in a waveguide system of a machine includes receiving one or more radio frequency signals at the node of a network including a plurality of nodes configured to communicate through one or more waveguides in the machine, extracting power at the node from the one or more radio frequency signals as a first power source, extracting power at the node from a second power source, and providing power from the node to one or more components configured to communicate with the node based on power extracted from either or both of the first power source and the second power source.

In addition to one or more of the features described above or below, or as an alternative, further embodiments may include separating a power transmission frequency from a communication transmission frequency of the one or more radio frequencies, and extracting power from the power transmission frequency as the first power source.

In addition to one or more of the features described above or below, or as an alternative, further embodiments may include passing a combined power and communication transmission frequency of the one or more radio frequencies from a circulator to a harvester configured to extract power.

In addition to one or more of the features described above or below, or as an alternative, further embodiments may include receiving wireless power from one or more of the nodes of the network as the second power source, and transferring wireless power from the node to one or more of the nodes of the network.

In addition to one or more of the features described above or below, or as an alternative, further embodiments may include extracting energy from an environment proximate to the power extraction system as the second power source.

A technical effect of the apparatus, systems and methods is achieved by a radio frequency waveguide system in mixed temperature environments as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
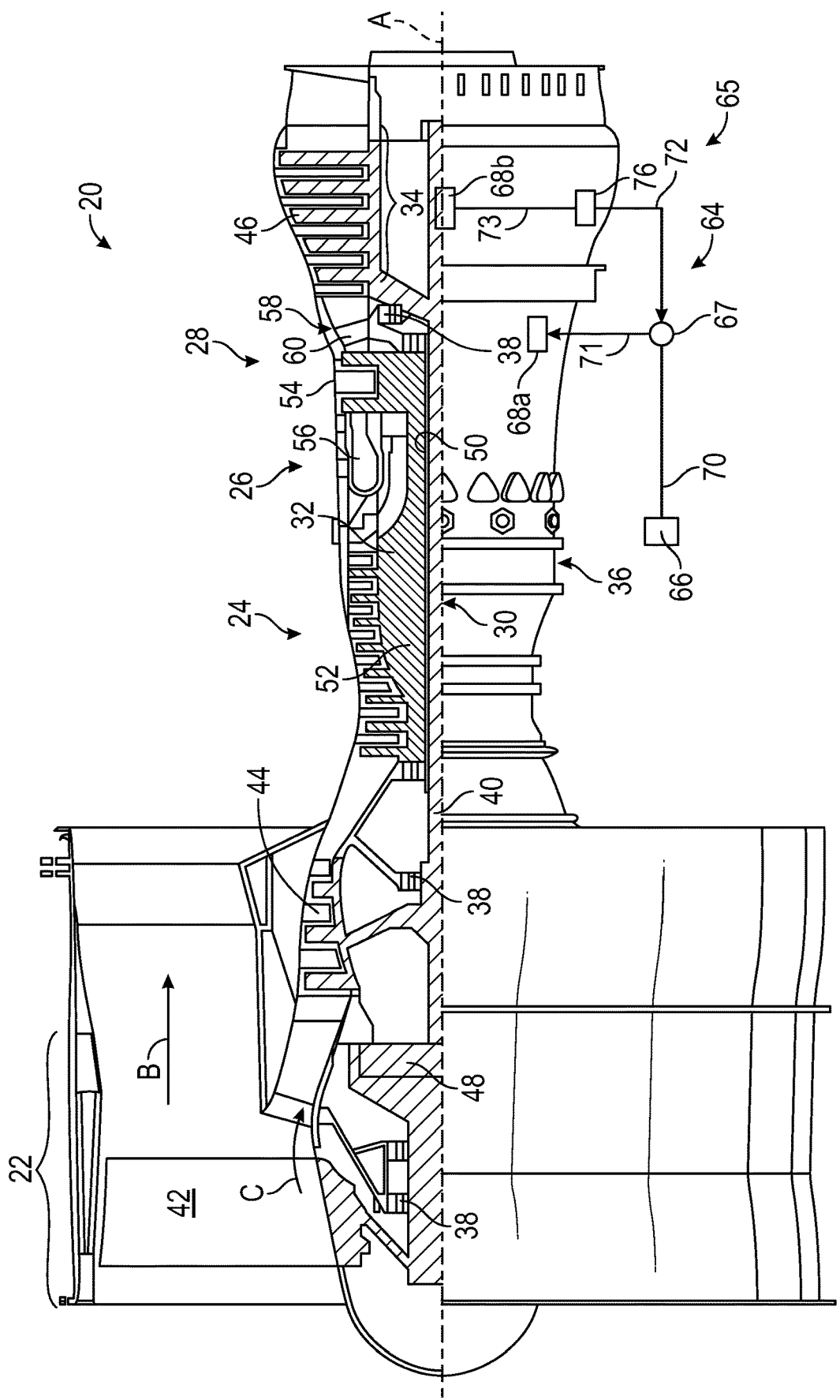
FIG. 1 is a cross-sectional view of a gas turbine engine as an example of a machine.

Various embodiments of the present disclosure are related to electromagnetic communication and power transfer through and to components of a machine. FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low pressure turbine 46 as related to the pressure at the outlet of the low pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The controller 66 may include various support interfaces and processing resources, such as input/output interfaces, processing systems, memory systems, communication interfaces, power management systems, and the like. The nodes 68a, 68b can be distributed throughout the gas turbine engine 20 or other such machine. Node 68a is an example of an actuator node that can drive one or more actuators/effectors of the gas turbine engine 20. Node 68b is an example of a sensor node that can interface with one or more sensors of the gas turbine engine 20. Nodes 68a, 68b can include processing support circuitry to transmit/receive electromagnetic signals between sensors or actuators and the controller 66. A coupler 67 can be configured as a splitter between a waveguide 70 coupled to the controller 66 and waveguides 71 and 72 configured to establish wireless communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the radio frequencies (e.g., electromagnetic signals) between the controller 66 and one or more of the nodes 68a, 68b. The transmission media within waveguides 70-73 may include dielectric or gaseous material. In embodiments, the waveguides 70-73 can be hollow metal tubes. The waveguides 70-73 may be rigid or may include flexible material. The disclosed system 64 may be utilized to control and/or monitor any component function or characteristic of a turbomachine, aircraft component operation, and/or other machines.

Prior control & diagnostic system architectures utilized in various applications include a centralized system architecture in which the processing functions reside in an electronic control module. Actuator and sensor communications were accomplished through analog wiring for power, command, position feedback, sensor excitation and sensor signals. Cables and connections include shielding to minimize effects caused by electromagnetic interference (EMI). The use of analog wiring and the required connections can limit application and capability of such systems due to the ability to locate wires, connectors and electronics in harsh environments that experience extremes in temperature, pressure, and/or vibration. Exemplary embodiments can use radio frequencies guided by the waveguides 70-73 in a wireless architecture to provide both electromagnetic communication signals and power to the individual elements of the network 65.

The use of electromagnetic radiation in the form of radio waves (MHz to GHz) to communicate and power the sensors and actuators using a traditionally complex wired system provides substantial architectural simplification, especially as it pertains to size, weight, and power (SWaP). Embodiments provide extension of a network where reduced SNR may compromise network performance by trading off data rates for an expansion of the number of nodes and distribution lines; thereby providing more nodes/sensors, with greater interconnectivity.

Figure 2:
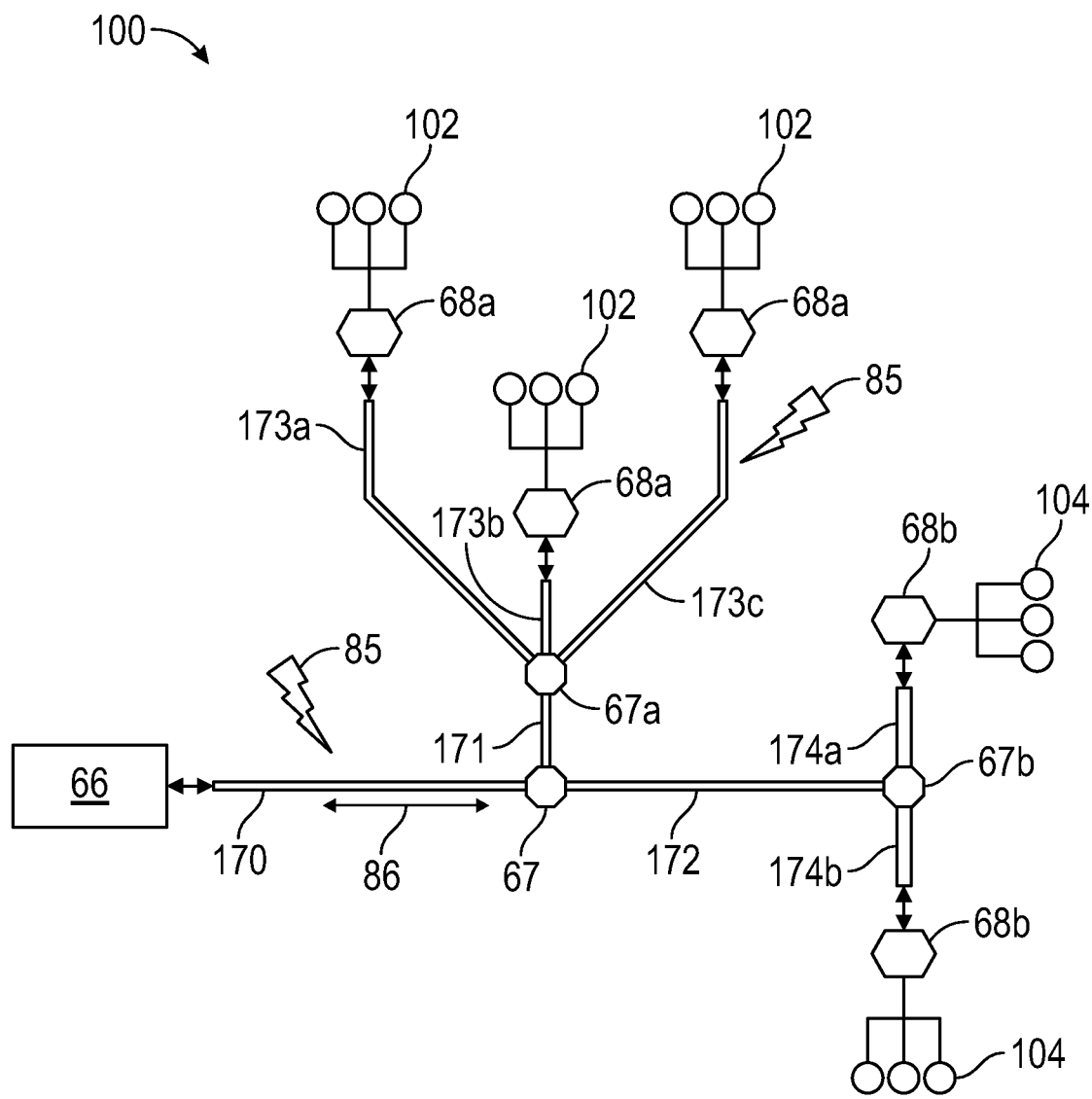
FIG. 2 is a schematic view of a guided electromagnetic transmission network in accordance with an embodiment of the disclosure.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Coupler 67a is further coupled to three nodes 68a through waveguides 173a, 173b, 173c in parallel. Each of the nodes 68a can interface or be combined with multiple actuators 102. Coupler 67b is also coupled to two nodes 68b through waveguides 174a, 174b in parallel. Each of the nodes 68b can interface or be combined with multiple sensors 104. Although the example of FIG. 2 depicts connections to actuators 102 and sensors 104 isolated to different branches, it will be understood that actuators 102 and sensors 104 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b can be associated with particular engine components, actuators or any other machine part from which information and communication is performed for monitoring and/or control purposes. The nodes 68a, 68b may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68a, 68b can transmit power and signals.

The example nodes 68a, 68b may include radio-frequency identification devices along with processing, memory and/or the interfaces to connect to conventional sensors or actuators, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and provide unauthorized access to information. In some embodiments, guided electromagnetic radiation is in the range 1-100 GHz. Electromagnetic radiation can be more tightly arranged around specific carrier frequencies, such as 3-4.5 GHz, 24 GHz, 60 GHz, or 76-77 GHz as examples in the microwave spectrum. A carrier frequency can transmit electric power, as well as communicate information, to multiple nodes 68a, 68b using various modulation and signaling techniques.

The nodes 68a with actuators 102 may include control devices, such as a solenoid, switch or other physical actuation devices. Radio frequency identification, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

In some embodiments, shielding in the guided electromagnetic transmission network 100 can be provided such that power and communication signals are shielded from outside interference, which may be caused by environmental electromagnetic or optic interference. Moreover, the shielding limits intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for monitored or controlled components in a guided electromagnetic transmission network. For example, the system 64 can be incorporated in a variety of harsh environment machines, such as manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that provides consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight while providing additional redundancy. Moreover, additional sensors can be added without the need for additional wiring and physical connections to the controller 66, which may provide for increased system accuracy and response. Embodiments can provide a "plug-n-play" approach to add a new node, potentially without a requalification of the entire system but only the new component; thereby greatly reducing qualification burdens.

Figure 3:
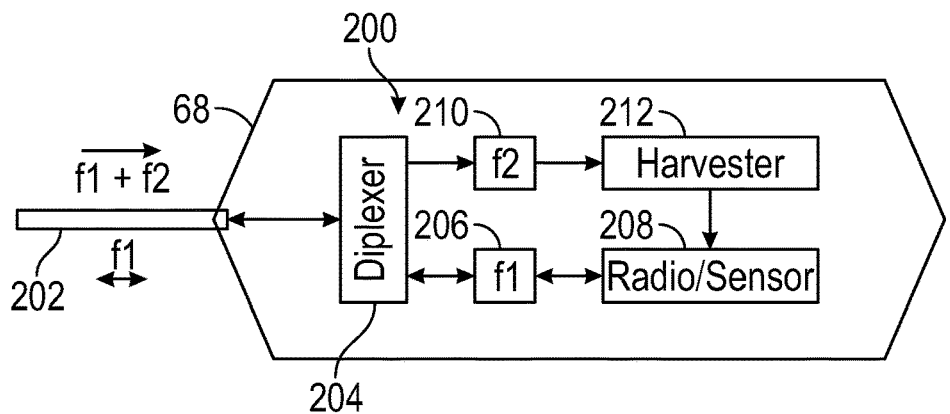
FIG. 3 is a schematic view of a power extraction system of a node of a radio frequency waveguide system in accordance with an embodiment of the disclosure.

FIG. 3 is a schematic view of a power extraction system 200 of a node 68 of a radio frequency waveguide system, such as system 64 of FIG. 1, configured to communicate with other components of the radio frequency waveguide system through one or more waveguides 202. The node 68 can be a generalized example of nodes 68a, 68b of FIGS. 1 and 2 configured to interface with one or more actuators 102, one or more sensors 104, or a combination thereof. In the example of FIG. 3, the power extraction system 200 includes a diplexer 204 configured to separate a power transmission frequency from a communication transmission frequency, where at least two radio frequencies are received at the node 68. A first frequency received at the diplexer 204 can be a communication transmission frequency and a second frequency can be a power transmission frequency. Either or both of the communication transmission frequency and the power transmission frequency can be in the microwave frequency spectrum. A first frequency filter 206 can be used to extract communication signals at the communication transmission frequency and pass the communication transmission frequency content to a radio/sensor interface 208. The radio/sensor interface 208 can be used to communicate with one or more actuators 102, one or more sensors 104, or a combination thereof. The radio/sensor interface 208 may also transmit communications, such as sensor data, back through the first frequency filter 206 and diplexer 204 for transmission through one or more waveguides 202.

The power extraction system 200 can also include a second frequency filter 210 to extract the power transmission frequency for a harvester 212. The harvester 212 is configured to extract power from the power transmission frequency as a first power source as further described herein. The harvester 212 can rectify and condition power received in the power transmission frequency for use by the radio/sensor interface 208 and/or other components of the node 68 or components external to the node 68. The node 68 can include other components not depicted in the examples of FIGS. 3 and 4, such as a microcontroller, memory devices, and other support elements.

Figure 4:
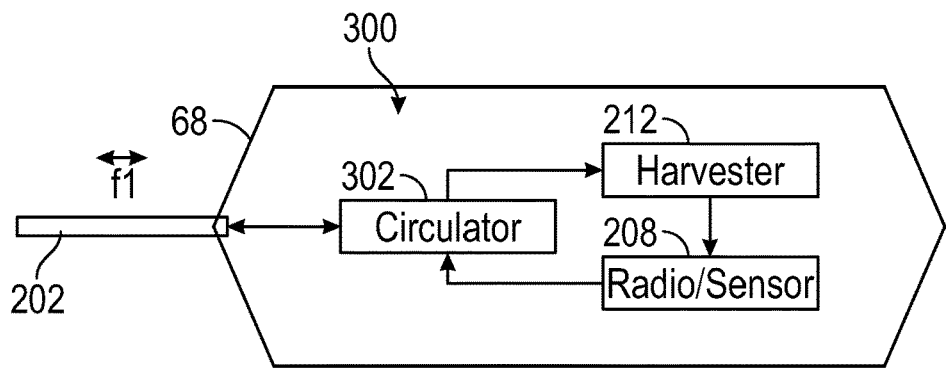
FIG. 4 is a schematic view of a power extraction system of a node of a radio frequency waveguide system in accordance with an embodiment of the disclosure.

FIG. 4 is a schematic view of a power extraction system 300 of a node 68 of a radio frequency waveguide system, such as system 64 of FIG. 1, configured to communicate with other components of the radio frequency waveguide system through one or more waveguides 202. The node 68 can be a generalized example of nodes 68a, 68b of FIGS. 1 and 2 configured to interface with one or more actuators 102, one or more sensors 104, or a combination thereof. In the example of FIG. 4, the power extraction system 300 includes a circulator 302 configured to pass a combined power and communication transmission frequency from the one or more radio frequencies to harvester 212 configured to extract power. In contrast to the example of FIG. 3, the circulator 302 can be used where the power and communication transmissions are at a same frequency, for instance, where a power transmission frequency is modulated with a data transmission frequency. The circulator 302 can support a one-way communication loop, where the combined power and communication transmission frequency is passed to the harvester 212. The harvester 212 can extract power from the combined power and communication transmission frequency and pass the remaining communication transmission to the radio/sensor interface 208. Radio transmissions from the radio/sensor interface 208 can be passed to the circulator 302 to be transmitted through one or more waveguides 202.

Figure 5:
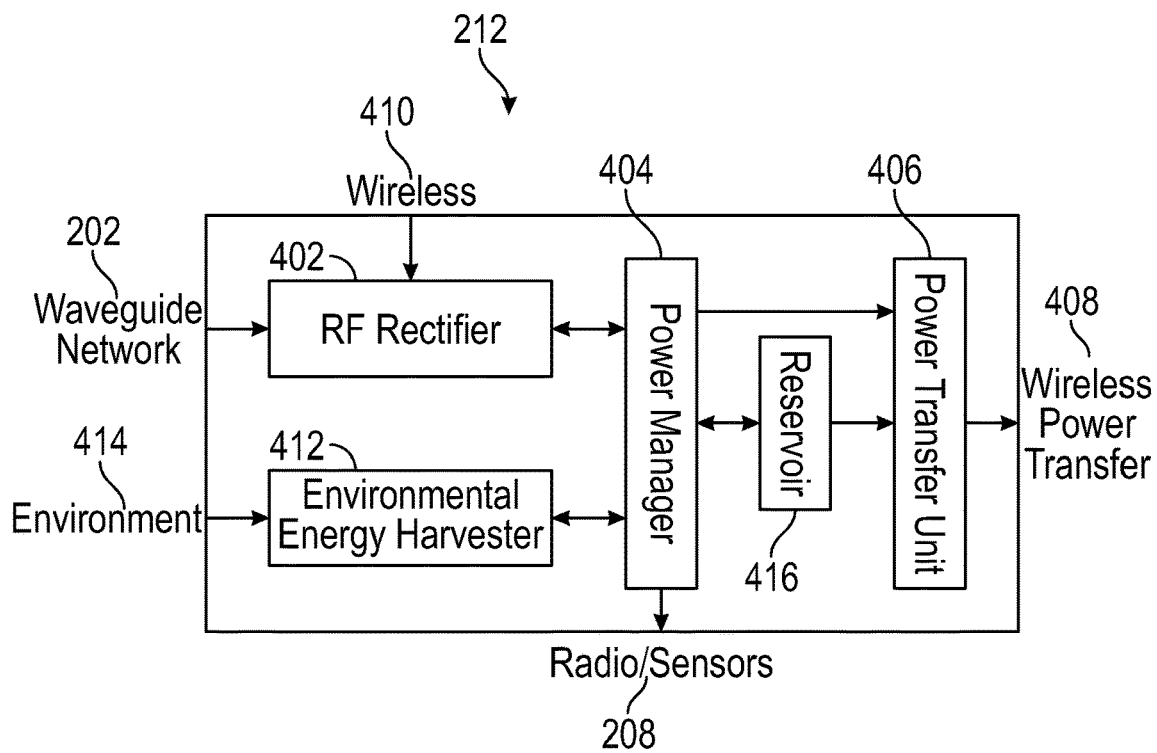
FIG. 5 is a schematic view of a harvester of a power extraction system in accordance with an embodiment of the disclosure.

FIG. 5 is a schematic view of harvester 212 of a power extraction system, such as the power extraction system 200, 300 of FIGS. 3 and 4. The harvester 212 can include a radio frequency rectifier 402 configured to perform power extraction from one or more radio frequencies, such as radio frequencies receive from one or more waveguides 202. The harvester 212 can also include a power manager 404 to control power distribution to the one or more components of a system, such as system 64 of FIG. 1. Power distribution by the power manager 404 can include providing power to the radio/sensor interface 208. The harvester 212 may also include a power transfer unit 406 configured to transfer wireless power 408 to one or more of the nodes 68, 68a, 68b of the network 100. The radio frequency rectifier 402 can also be configured to receive wireless power 410 from one or more of the nodes 68, 68a, 68b of the network 100 as a second power source. The harvester 212 may include an environmental energy harvester 412 configured to extract energy from an environment 414 proximate to the power extraction system 200, 300 as a second power source. Examples of the environmental energy harvester 412 can include vibration-based energy harvesting, thermal-based energy harvesting, pressure-based energy harvesting, and other such energy harvesting that converts environmental energy into electrical energy. The harvester 212 may also include a reservoir 416 configured to store power. The reservoir 416 can be a battery, a super-capacitor, an ultra-capacitor, or other energy storage element. The power manager 404 can be configured to provide power to communicate with controller 66 (FIGS. 1, 2) and to power at least one sensor 104 and/or actuator 102 of a gas turbine engine 20 based on power selected from at least one of the first power source, the second power source, and the reservoir 416. The various capabilities for extracting power, storing power, and transmitting power can be leveraged to transfer power within the system 64 as needed to maintain uninterrupted electrical power to one or more nodes 68, 68a, 68b.

Figure 6:
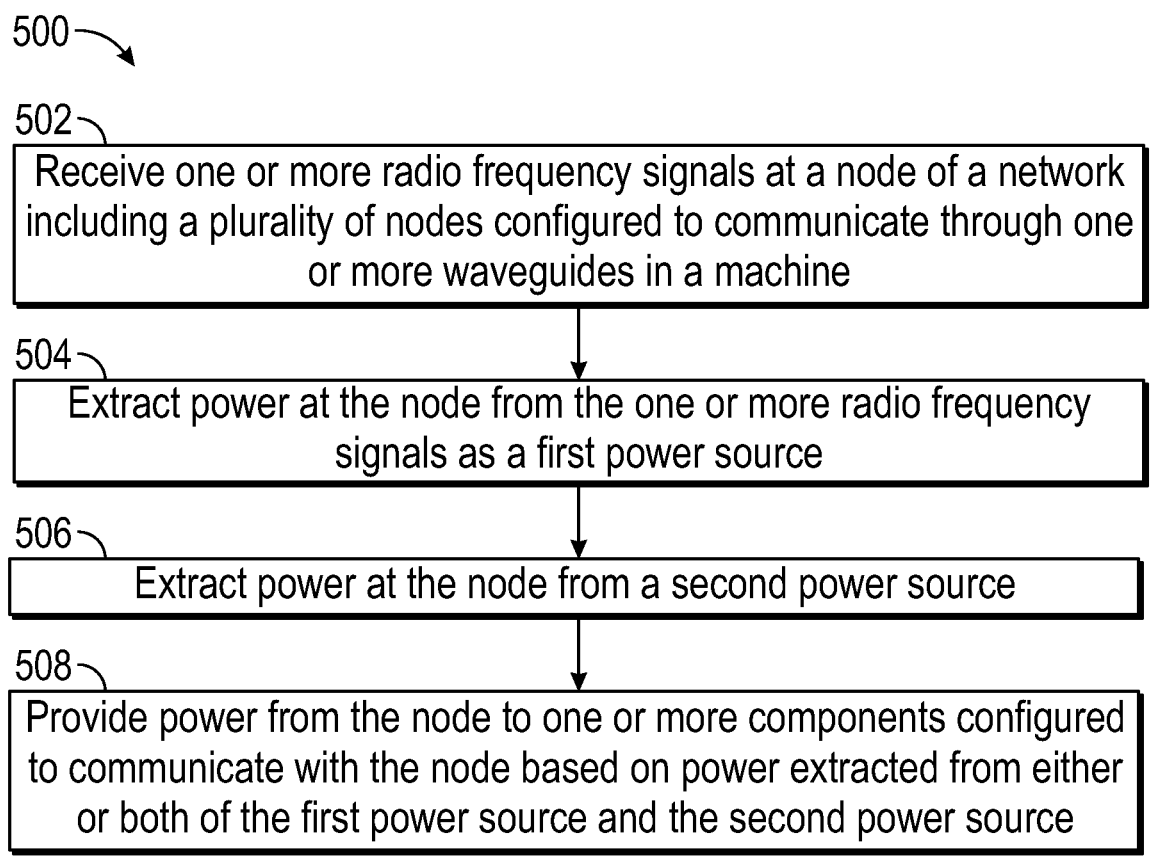
FIG. 6 is a flow chart illustrating a method in accordance with an embodiment of the disclosure.

FIG. 6 is a flow chart illustrating a method 500 of powering a node in a waveguide system of a machine, such as the gas turbine engine 20 of FIG. 1 in accordance with an embodiment. The method 500 of FIG. 6 is described in reference to FIGS. 1-5 and may be performed with an alternate order and include additional steps. For purposes of explanation, the method 500 is primarily described in reference to FIG. 1 but can also be implemented on the guided electromagnetic transmission network 100 of FIG. 2 and other network variations and a variety of machines. The machine may operate in or produce a mixed temperature environment including higher temperatures (e.g., >150 degrees C.) beyond the normal range of microelectronics, which is typically less than 100 degrees C. The local temperature at different sections of the machine can vary substantially, such as upstream from combustion, at a fuel combustion location, and downstream from combustion.

At block 502, one or more radio frequency signals are received at a node of a network including a plurality of nodes configured to communicate through one or more waveguides in a machine. Examples can include nodes 68, 68a, 68b, and the machine can be the gas turbine engine 20 of FIG. 1 or another type of machine as previously described.

At block 504, power can be extracted at the node 68, 68a, 68b from the one or more radio frequency signals as a first power source. For example, the radio frequency rectifier 402 can be used to extract power from one or more radio frequency signals received through one or more waveguides 202.

At block 506, power can be extracted at the node 68, 68a, 68b from a second power source. The second power source can be wireless power 410 received at the radio frequency rectifier 402 from one or more of the nodes 68, 68a, 68b of the network 100. As another example, energy can be extracted by environmental energy harvester 412 from an environment 414 proximate to the power extraction system 200, 300 as the second power source.

At block 508, power is provided from the node 68, 68a, 68b to one or more components configured to communicate with the node 68, 68a, 68b based on power extracted from either or both of the first power source and the second power source.

The nodes 68, 68a, 68b can be portions of a network 65 configured to communicate through a plurality of electromagnetic signals, where the nodes 68, 68a, 68b are distributed throughout the machine, such as the gas turbine engine 20. Multiple nodes 68, 68a, 68b can be used in a complete system 64 to take advantage of architecture scalability. Each of the nodes 68, 68a, 68b can be associated with at least one actuator 102 or sensor 104 of the gas turbine engine 20. For example, one or more of the nodes 68, 68a, 68b can be located at one or more of a fan section 22, a compressor section 24, a combustor section 26, and/or a turbine section 28 of the gas turbine engine 20.

In some embodiments, the node 68, 68a, 68b can include a diplexer 204 configured to separate a power transmission frequency from a communication transmission frequency of the one or more radio frequencies and a harvester 212 configured to extract power from the power transmission frequency as the first power source. Alternatively, a circulator 302 can be configured to pass a combined power and communication transmission frequency from the one or more radio frequencies to the harvester 212 configured to extract power. Other variations of power extraction and distribution are contemplated with the scope of the invention.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system of a machine, the system comprising:
a network of a plurality of nodes distributed throughout the machine, each of the nodes operable to communicate through one or more radio frequencies;
a controller configured to communicate with the network of nodes by transmitting the one or more radio frequencies through one or more waveguides; and
a power extraction system within at least one of the nodes, the power extraction system comprising a harvester configured to extract power from the one or more radio frequencies as a first power source, extract power from a second power source, and provide power to one or more components of the system based on power extracted from either or both of the first power source and the second power source, wherein the harvester comprises:
a radio frequency rectifier configured to perform power extraction from the one or more radio frequencies and from wireless power received from one or more of the nodes;
a power manager configured to control power distribution to the one or more components of the system; and
a power transfer unit configured to transfer wireless power to one or more of the nodes of the network.

2. The system of claim 1, wherein the power extraction system comprises:
a diplexer configured to separate a power transmission frequency from a communication transmission frequency of the one or more radio frequencies; and
wherein the harvester is configured to extract power from the power transmission frequency as the first power source.

3. The system of claim 1, wherein the power extraction system comprises:
a circulator configured to pass a combined power and communication transmission frequency from the one or more radio frequencies to the harvester.

4. The system of claim 1, wherein the harvester further comprises an environmental energy harvester configured to extract energy from an environment proximate to the power extraction system.

5. The system of claim 1, further comprising a radio/sensor interface configured to communicate with one or more actuators, one or more sensors, or a combination thereof.

6. The system of claim 5, wherein the radio/sensor interface is configured to transmit communications through the one or more waveguides.

7. The system of claim 6, wherein the harvester is configured to rectify and condition power received in a power transmission for use by the radio/sensor interface.

8. A system for a gas turbine engine, the system comprising:
a network of a plurality of nodes distributed throughout the gas turbine engine, each of the nodes associated with at least one sensor and/or actuator of the gas turbine engine and operable to communicate through one or more radio frequencies;
a controller of the gas turbine engine configured to communicate with the network of nodes by transmitting the one or more radio frequencies through one or more waveguides; and
a power extraction system within at least one of the nodes, the power extraction system comprising a harvester configured to extract power from the one or more radio frequencies as a first power source, extract power from a second power source, and provide power to one or more components of the system based on power extracted from either or both of the first power source and the second power source, wherein the harvester comprises:
a radio frequency rectifier configured to perform power extraction from the one or more radio frequencies and from wireless power received from one or more of the nodes;
a power manager configured to control power distribution to the one or more components of the system; and
a power transfer unit configured to transfer wireless power to one or more of the nodes of the network.

9. The system of claim 8, wherein the power extraction system comprises:
a diplexer configured to separate a power transmission frequency from a communication transmission frequency of the one or more radio frequencies; and
wherein the harvester is configured to extract power from the power transmission frequency as the first power source.

10. The system of claim 8, wherein the power extraction system comprises:
a circulator configured to pass a combined power and communication transmission frequency from the one or more radio frequencies to the harvester.

11. The system of claim 8, wherein the harvester further comprises an environmental energy harvester configured to extract energy from an environment proximate to the power extraction system.

12. The system of claim 8, wherein the harvester further comprises a reservoir configured to store power, and wherein the power manager is configured to provide power to communicate with the controller and to power the at least one sensor and/or actuator of the gas turbine engine based on power selected from at least one of the first power source, the second power source, and the reservoir.

13. The system of claim 8, further comprising a radio/sensor interface configured to communicate with one or more actuators, one or more sensors, or a combination thereof.

14. The system of claim 13, wherein the radio/sensor interface is configured to transmit communications through the one or more waveguides.

15. The system of claim 14, wherein the harvester is configured to rectify and condition power received in a power transmission for use by the radio/sensor interface.

16. A method of powering a node in a waveguide system of a machine, the method comprising:
receiving one or more radio frequency signals at the node of a network including a plurality of nodes configured to communicate through one or more waveguides in the machine;
extracting power by a harvester at the node from the one or more radio frequency signals as a first power source;
extracting power by the harvester at the node from a second power source; and
providing power from the node to one or more components configured to communicate with the node based on power extracted from either or both of the first power source and the second power source, wherein the harvester comprises a radio frequency rectifier configured to perform power extraction from the one or more radio frequencies and from wireless power received from one or more of the nodes, a power manager configured to control power distribution to the one or more components of the system, and a power transfer unit configured to transfer wireless power to one or more of the nodes of the network.

17. The method of claim 16, further comprising:
separating a power transmission frequency from a communication transmission frequency of the one or more radio frequencies; and
wherein the harvester is configured to extracting power from the power transmission frequency as the first power source.

18. The method of claim 17, further comprising:
passing a combined power and communication transmission frequency of the one or more radio frequencies from a circulator to the harvester.

19. The method of claim 16, further comprising:
extracting energy from an environment proximate to the power extraction system.

* * * * *